US010677238B2

(12) United States Patent
Ezzo

(10) Patent No.: US 10,677,238 B2
(45) Date of Patent: Jun. 9, 2020

(54) FILLED RESIN LAYER SEPARATED PUMP HOUSING

(71) Applicant: Ingersoll-Rand Industrial U.S., Inc., Davidson, NC (US)

(72) Inventor: Mark Anthony Ezzo, Troutman, NC (US)

(73) Assignee: Ingersoll-Rand Industrial U.S., Inc., Davidson, NC (US)

(*) Notice: Subject to any disclaimer, the term of this patent is extended or adjusted under 35 U.S.C. 154(b) by 224 days.

(21) Appl. No.: 15/806,971

(22) Filed: Nov. 8, 2017

(65) Prior Publication Data
US 2019/0136845 A1 May 9, 2019

(51) Int. Cl.
F04B 43/02 (2006.01)
F04B 53/16 (2006.01)
F04B 53/22 (2006.01)
F04B 15/04 (2006.01)
F04B 43/00 (2006.01)
F16J 3/02 (2006.01)

(52) U.S. Cl.
CPC ............ F04B 43/02 (2013.01); F04B 15/04 (2013.01); F04B 43/0009 (2013.01); F04B 53/16 (2013.01); F04B 53/22 (2013.01); F16J 3/02 (2013.01)

(58) Field of Classification Search
CPC .......... F04B 43/02; F04B 53/16; F04B 53/22; F04B 43/0009; F04B 43/0736; F04B 15/04; F16J 3/02; F16J 3/00
USPC ............................................. 417/521; 92/96
See application file for complete search history.

(56) References Cited

U.S. PATENT DOCUMENTS

| 2,877,501 A | 3/1959 | Bradt |
| 2,913,993 A * | 11/1959 | Toulmin, Jr. ............ F04B 1/122 91/488 |
| 3,291,005 A * | 12/1966 | Anderson .................. F16J 3/02 92/100 |
| 4,443,507 A | 4/1984 | Yamada et al. |
| 4,867,653 A * | 9/1989 | Mills ..................... F01L 25/063 417/360 |

(Continued)

FOREIGN PATENT DOCUMENTS

| CN | 101142408 A | 3/2008 |
| CN | 102395789 A | 3/2012 |

(Continued)

OTHER PUBLICATIONS

European Search Report dated Apr. 9, 2019, Application No. 18204753.0, Filed Nov. 6, 2018.

(Continued)

Primary Examiner — Nathaniel E Wiehe
Assistant Examiner — Richard C Drake
(74) Attorney, Agent, or Firm — Taft Stettinius & Hollister LLP

(57) ABSTRACT

A pump configured to move fluid from one location to another location is provided. The pump includes a pump housing. The pump housing is composed of a wall structure. The wall structure includes a first laminar portion of a thickness of the wall structure composed of a resin that does not include any reinforcing fibers. The wall structure also includes a second laminar portion of the thickness of the wall structure that is composed a resin with reinforcing fibers dispersed through the resin.

20 Claims, 7 Drawing Sheets

(56) References Cited

U.S. PATENT DOCUMENTS

| | | | |
|---|---|---|---|
| 5,599,630 A | 2/1997 | Smith et al. | |
| 5,642,991 A | 7/1997 | Singleterry et al. | |
| 5,699,717 A * | 12/1997 | Riedlinger | F04B 43/0054 92/103 R |
| 5,894,784 A * | 4/1999 | Bobbitt | F01B 19/02 417/395 |
| 6,338,295 B1 * | 1/2002 | Kubota | F04B 43/02 417/413.1 |
| 7,244,357 B2 | 7/2007 | Herrington et al. | |
| 7,419,631 B2 | 9/2008 | Guichard et al. | |
| 8,151,703 B2 | 4/2012 | Schweizer et al. | |
| 8,211,537 B2 | 7/2012 | Yokoe et al. | |
| 8,415,007 B2 | 4/2013 | Honma et al. | |
| 8,657,595 B2 | 2/2014 | Feigenblum et al. | |
| 9,291,158 B2 | 3/2016 | Cochran et al. | |
| 2005/0031467 A1 * | 2/2005 | Caldwell | F04B 43/0736 417/395 |
| 2005/0249610 A1 | 11/2005 | Fischer | |
| 2007/0065309 A1 * | 3/2007 | Nakajima | F04B 43/023 417/413.1 |
| 2010/0071776 A1 * | 3/2010 | Ringer | F16K 7/126 137/12 |
| 2010/0143648 A1 | 6/2010 | Tsai et al. | |
| 2013/0078125 A1 * | 3/2013 | Headley | F04B 43/026 417/521 |
| 2014/0010679 A1 * | 1/2014 | Rice | F04B 27/00 417/228 |
| 2014/0096678 A1 * | 4/2014 | Shimomura | B60T 11/00 92/96 |
| 2014/0241905 A1 * | 8/2014 | Seith | F04B 43/0081 417/53 |
| 2014/0352036 A1 * | 12/2014 | Cadens Ballarin | B29C 70/44 2/410 |
| 2015/0202807 A1 | 7/2015 | Sano et al. | |
| 2017/0107981 A1 * | 4/2017 | Ishimaru | F04B 43/02 |
| 2018/0045190 A1 * | 2/2018 | Ezzo | B29C 45/1676 |

FOREIGN PATENT DOCUMENTS

| | | |
|---|---|---|
| EP | 687548 A2 | 12/1995 |
| EP | 1396637 A2 | 3/2004 |
| EP | 2422090 A2 | 2/2012 |
| EP | 3055572 A1 | 8/2016 |

OTHER PUBLICATIONS

Steve Verschaeve; HP Plastics by RocTool; Tech Day Jun. 9.
Roctool Innovative Molding Technologies; SEM Observation in thickness.
Roctool Innovative Molding Technologies; Glass fillers resins covered using RocTool technology.
CN Office Action dated Sep. 3, 2019; Issue Serial No. 2019082901682910.

* cited by examiner

FILLED RESIN LAYER SEPARATED PUMP HOUSING

TECHNICAL FIELD AND SUMMARY

The present disclosure relates to pumps such as diaphragm pumps, for example. Particularly, the present disclosure relates to a resin pump body for a diaphragm pump, where the resin pump body includes separated laminar layers composed of an outer layer of resin blended with a reinforcing fiber, and an inner resin-only material layer.

Pumps that move fluid from one location to another location, such as diaphragm pumps, are known. These pumps often include one or more diaphragms to move the fluid. Typically, a fluid side of the diaphragm is in fluid communication with an inlet manifold. Each diaphragm moves linearly in one direction to draw in fluid from a fluid source through the inlet manifold. An outlet manifold is also in fluid communication with the fluid chamber. After drawing the fluid in, the diaphragm then moves in an opposite direction to push that fluid out to another location through the outlet manifold. The outlet manifold serves as a passageway through which fluid is expelled via an opposite force applied to the fluid by the diaphragm. Repeatedly moving the diaphragm back and forth, fluid is consistently drawn into and pushed out of the pump.

The bodies or housing structures that compose the fluid chambers, manifolds, and other components of the pump are typically made from either a cast metal, fiber reinforced resin, or just a resin material itself. The latter resin-only pump may only be used in light fluid transfer applications, however, because the resin itself does not possess sufficient strength to withstand large-pressure pump applications. Resin blended with reinforcing fibers, such as glass fibers, make for stronger pump housings. These pumps, however, are useful in only limited applications because the wall thicknesses of the pumps need to be relatively thick to have the necessary strength. Also, the reinforcing fibers at the surface of the pumped fluid may cause contamination. A cast metal pump housing is substantially stronger than fiber reinforced resin. But cast metal has limitations in that it is substantially heavier than either resin or a fiber reinforced resin. Accordingly, cast metal too may not be usable in every application.

To that end, it becomes a compromise between the benefits and detriments of a resin-only, fiber reinforced resin, or cast metal pump body, to determine which material to use. Fiber reinforced resin is lighter than cast metal, and it is stronger than resin-only. But fiber reinforced resin still requires relatively very thick walls to meet the mechanical demands, long endurance, and high force requirements. Furthermore, unique to fiber-resin pumps are the presence of the fibers that exist on the inner surfaces (i.e., fluid contact surfaces) of the pump walls. The fibers have a tendency to migrate to the surface of injection molded parts due to rheological properties associated with thermoplastics. These fibers may produce contamination in the pump. The fibers may also produce a rough interior surface on the wall which may create drag on the fluid as it's traveling through the pump. This might, therefore, present performance issues with the pump itself.

Accordingly, an illustrative embodiment of the present disclosure provides a pump housing—illustratively, a diaphragm pump housing—that is composed of a relatively thin fiber reinforced resin wall. At the same time the pump housing walls do not include reinforcing fibers on the fluid-side wall surface inside the pump housing. Illustratively, a pump body part such as, but not limited to, a manifold or head may be created with a layer of resin-only material on the fluid side of the part, but have glass or other like reinforcing fibers disbursed throughout the remainder of the housing wall. This may be accomplished by injection molding the part and putting a heating element on the side of the mold where the part will be in contact with fluid during its end use. The heating element will be used to raise the temperature of the mold for a brief time which will cause laminar separation creating separate resin-only and resin-fiber strata in the housing wall. In another embodiment, heating the mold using conventional cooling lines may be another way to accomplish this. Employing fluid, whether hot water, hot oil, or steam, to elevate the surface temperature of the mold might produce the same effect. That said, the cycle time is increased which might be detrimental to the laminar separation approach.

It is noted that these separate layers are not individual laminated structures bonded together to form the pump housing wall, but instead is a single layer with the resin-only portion located towards the fluid-side surface of the wall. It is believed that by creating this separation within the layer to create the part, the wall is substantially stronger than a resin-only wall. At the same time, the resin-only surface provides a smooth interior surface for the fluid to flow. Accordingly, this pump wall composition includes properties of high strength while being relatively thin, and does not inhibit fluid flow with fibers at the fluid contact surface. This creates a design that is stronger while reducing the overall thickness of the pump housing wall, and therefore, be more cost effective.

Another illustrative embodiment of the present disclosure provides a pump configured to move fluid from one location to another location. The pump comprises: an inlet manifold; at least one fluid chamber in fluid communication with the inlet manifold; an outlet manifold in fluid communication with the fluid chamber; wherein the inlet manifold, the outlet manifold, and the at least one fluid chamber collectively form a pump housing of the pump; wherein the pump housing is composed of a wall structure; wherein the wall structure includes a fluid-side interior surface, an exterior surface, and a thickness located between the fluid-side interior and exterior surfaces; wherein the fluid-side interior surface of the wall structure is in fluid contact with the fluid that is moved through the pump; wherein the pump housing is composed of a resin having reinforcing fibers dispersed in the resin throughout the thickness of the wall structure except at the fluid-side interior surface of the pump housing; wherein the fluid-side surface of the pump housing is composed of resin and is substantially free of any of the reinforcing fibers that are otherwise dispersed throughout the thickness of the pump housing; wherein the wall structure of each of the inlet manifold, the outlet manifold, and the at least one fluid chamber includes at least one or more ribs extending from the exterior surface opposite the fluid-side surface of the wall structure; wherein the wall structure of each of the inlet manifold, the outlet manifold, and the at least one fluid chamber each includes at least one cross rib extending from the exterior surface opposite the fluid-side surface of the wall structure and transverse to the at least one or more ribs; and where each of the at least one or more ribs and the at least one cross rib are composed of the resin having reinforcing fibers dispersed in the resin.

In the above and other illustrative embodiments, the pump may further comprise: the pump housing that includes a second fluid chamber in fluid communication with the inlet and the outlet manifolds; the pump being a diaphragm pump; the reinforcing fibers is selected from glass, talc, calcium carbonate, aramid fiber, stainless steel, carbon, and wollastonite; the resin is selected from the group consisting of polypropylene families, polyvinylidene fluoride, acetal families, fully fluorinated polymer families, perfluoroalkoxy alkanes, fluorinated ethylene propylene, polyamide families, and polyphenylene sulfide; the fluid-side interior surface is not a separably distinct layer laminated onto the resin having reinforcing fibers dispersed in the resin throughout the thickness of the wall structure; a laminar portion of the thickness opposite the exterior surface and at the fluid-side interior surface is composed of the resin that does not include any reinforcing fibers; the at least one or more ribs being a plurality of spaced-apart ribs; and the at least one transverse rib being a plurality of transverse ribs.

Another illustrative embodiment of the present disclosure provides a pump configured to move fluid from one location to another location. The pump comprises: a pump housing of the pump; wherein the pump housing is composed of a wall structure; wherein the wall structure includes a fluid-side interior surface, an exterior surface, and a thickness located between the fluid-side interior and exterior surfaces; wherein the fluid-side interior surface of the wall structure is in fluid contact with the fluid that is moved through the pump; wherein the pump housing is composed of a resin having reinforcing fibers dispersed in the resin throughout the thickness of the wall structure except at the fluid-side interior surface of the pump housing; and wherein the fluid-side surface of the pump housing is composed of resin and is substantially free of any of the reinforcing fibers that are otherwise dispersed throughout the thickness of the pump housing.

In the above and other illustrative embodiments, the pump may further comprise: the pump housing of the pump including an inlet manifold, at least one fluid chamber in fluid communication with the inlet manifold, and an outlet manifold in fluid communication with the fluid chamber; the inlet manifold, the outlet manifold, and the at least one fluid chamber collectively forming a pump housing of the pump; the wall structure of each of the inlet manifold, the outlet manifold, and the at least one fluid chamber including at least one or more ribs extending from the exterior surface opposite the fluid-side surface of the wall structure; the wall structure of each of the inlet manifold, the outlet manifold, and the at least one fluid chamber each including at least one cross rib extending from the exterior surface opposite the fluid-side surface of the wall structure and transverse to the at least one or more ribs; each of the at least one or more ribs and the at least one cross rib being composed of the resin having reinforcing fibers dispersed in the resin; the fluid-side interior surface being not a separably distinct layer laminated onto the resin having reinforcing fibers dispersed in the resin throughout the thickness of the wall structure; a laminar portion of the thickness opposite the exterior surface and at the fluid-side interior surface being composed of the resin that does not include any reinforcing fibers; the at least one or more ribs being a plurality of spaced-apart ribs, and wherein the at least one transverse rib is a plurality of transverse ribs.

Another illustrative embodiment of the present disclosure provides a pump configured to move fluid from one location to another location. The pump comprises: a pump housing of the pump; wherein the pump housing is composed of a wall structure; and wherein a first laminar portion of a thickness of the wall structure composed a resin that does not include any reinforcing fibers and a second laminar portion of the thickness of the wall structure composed a resin with reinforcing fibers dispersed through the resin.

In the above and other illustrative embodiments, the pump may further comprise: the wall structure, including a fluid-side interior surface and exterior surface, wherein the thickness being located between the fluid-side interior and exterior surfaces, and wherein the first laminar portion of the thickness of the wall structure being located at the fluid-side interior surface, and the second laminar portion of the thickness of the wall structure being located adjacent the first laminar portion and the exterior surface.

Additional features and advantages of the paperboard tray with the separated laminar pump housing will become apparent to those skilled in the art upon consideration of the following detailed description of the illustrated embodiments exemplifying best modes of carrying out the separated laminar pump housing, as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
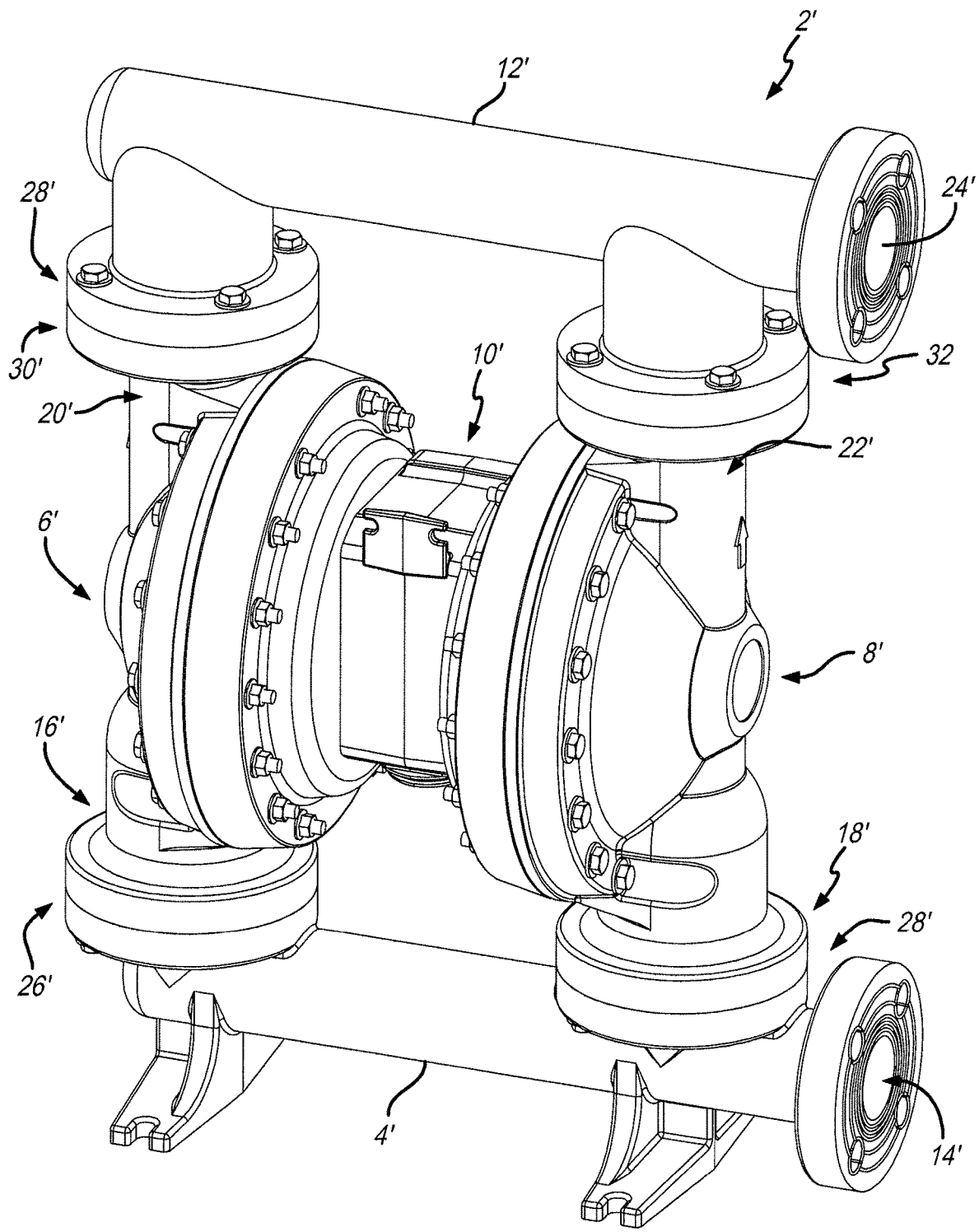
FIG. 1 is a perspective view of a PRIOR ART diaphragm pump.

Corresponding reference characters indicate corresponding parts throughout the several views. The exemplification set out herein, illustrates embodiments of the separated laminar pump housing, and such exemplification is not to be construed as limiting the scope of the separated laminar pump housing, in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

A perspective view of a PRIOR ART view of a diaphragm pump 2' is shown in FIG. 1. Diaphragm pump 2' illustratively includes an inlet manifold 4' that connects to fluid chambers 6' and 8', housing body 10' and outlet manifold 12'. Illustratively, fluid from a fluid source enters inlet opening 14' and is drawn up through either passage 16' or 18' depending on which diaphragm is drawing up fluid at the time. Typically, diaphragms within fluid chambers 6' and 8' alternate drawing fluid up from inlet manifold 4' and pushing out through outlet manifold 12'. For example, a first diaphragm may draw fluid up through passage 16' and into fluid chamber 6' while second fluid chamber 8', which previously received fluid up through passage 18', pushes fluid out through outlet manifold 12'. Subsequently, fluid that is now located in fluid chamber 6' is pushed out through outlet manifold 12' as the diaphragm in fluid chamber 8' draws up fluid from inlet manifold 4'. This alternate cycle repeats continuously as the diaphragms move back and forth in fluid chamber 6' and 8', respectively. Outlet passages 20' and 22' are in fluid communication with outlet manifold 12' so fluid can be expelled through outlet opening 24', flange couplings 26', 28', 30', and 32', connect inlet and outlet manifolds 4' and 12' to fluid chambers 6' and 8', as shown. Bolts or other fasteners may be used to attach the foregoing structures together. Similarly, bolts may be used to couple fluid chamber 6' and 8' to housing 10'. Bolts are illustratively used because often the fluid is under high pressure which causes a relatively significant amount of stress to body components of diaphragm pump 2'. Additionally, the material for the structures needs to be strong in order to withstand that stress. As a consequence, for this pump design, being made from a thick resin material to impart as much strength as the resin of these pump housing components can withstand Accordingly, an illustrative embodiment of the present disclosure provides a diaphragm pump 2 as shown in the perspective view of FIG. 2. This embodiment, diaphragm pump 2 includes an inlet manifold 4, fluid chambers 6 and 8, housing 10, and outlet manifold 12. Diaphragm pump 2 itself illustratively operates the same as PRIOR ART diaphragm pump 2' where fluid enters into inlet manifold 4, is distributed into either fluid chambers 6 or 8, and then using diaphragms located within fluid chambers 6 and 8, pushes fluid out through outlet manifold 12. And just like the PRIOR ART, as one of the diaphragms draws fluid in from inlet manifold 4, the other diaphragm pushes fluid out through outlet manifold 12. This cycle repeats just as described in PRIOR ART diaphragm pump 2'.

Figure 2:
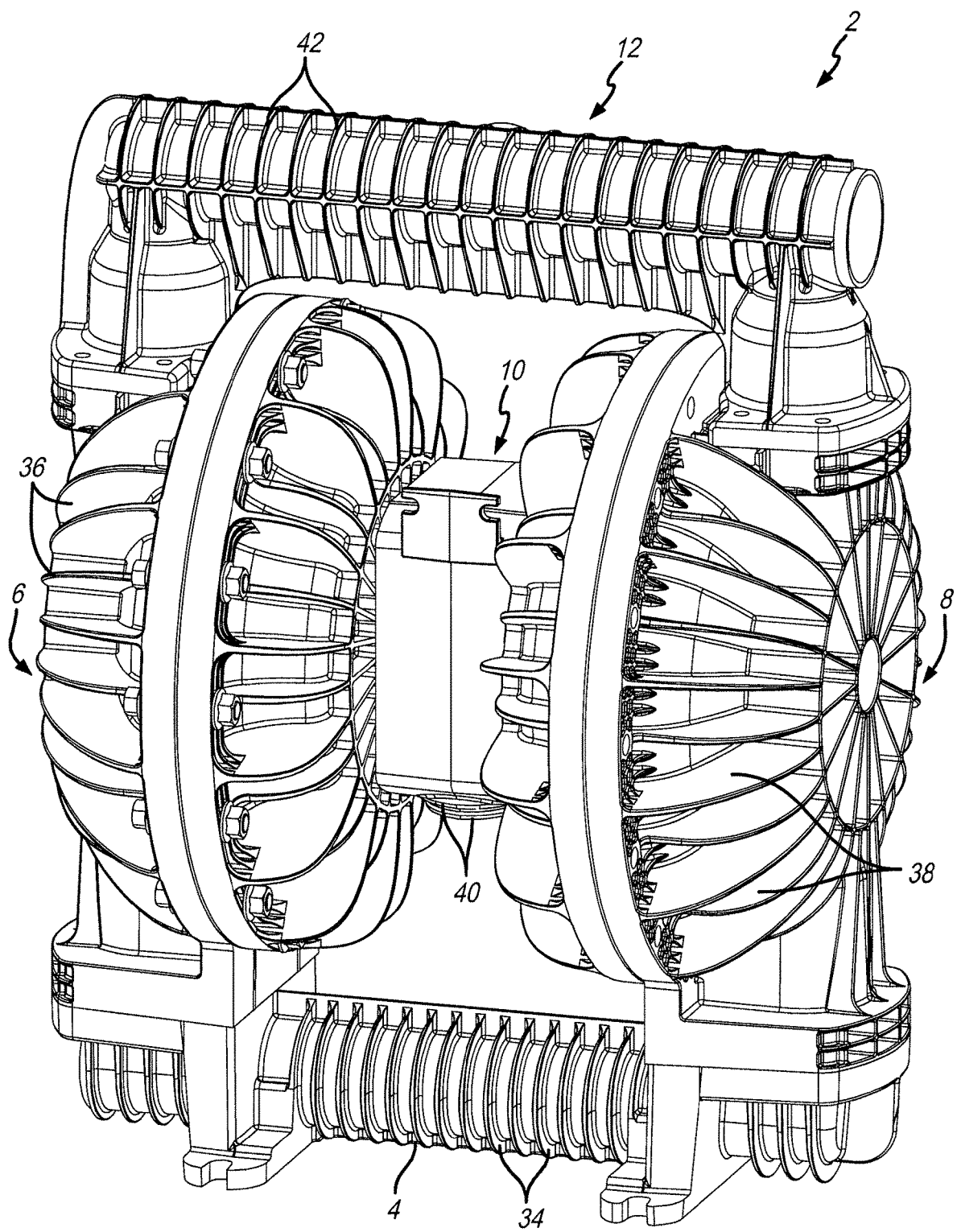
FIG. 2 is a perspective view of a diaphragm pump according to the present disclosure.

A difference between diaphragm pump 2 in FIG. 2 and PRIOR ART diaphragm pump 2' in FIG. 1, is that the structures that make up the body of diaphragm pump 2 are composed of significantly less material than that of PRIOR ART diaphragm pump 2'. Indeed, for similar operating specifications—diaphragm pump 2 uses about 50% less material than what is necessary for use in PRIOR ART diaphragm pump 2'. This may translate into as much as about 50% cost savings for a fluid pump having comparable operating specifications.

Diaphragm pump 2 of FIG. 2 includes manifold 4, fluid chambers 6 and 8, housing 10, and outlet manifold 12 made from a resin that includes reinforcing fibers. In contrast, PRIOR ART diaphragm pump 2' is made of resin only. That said, the body wall structures of diaphragm pump 2 have separated laminar layers of a resin-only layer which faces the interior portions of these components, and a reinforcing fiber resin layer which faces the outer portions of the components (see, also, FIG. 4). This configuration overcomes the problems with using a fiber reinforced resin throughout the pump body wall. Particularly, exposed reinforcing fibers located on interior pump surfaces make for rough surfaces and may produce drag on passing fluid. In contrast, the forgoing pump body parts of diaphragm pump 2 have smooth interior fluid-contact surfaces indicative of a resin-only pump. But the remainder of the body thickness is composed of a fiber reinforced resin. This enables a unique composite structure with one mold filling shot essentially creating separate layers. This enables wall sections to be decreased from the traditional thick wall features by having much stiffer reinforcements to support the forces exerted on the pumps during operation. Illustratively, the reinforcing fibers may be selected from glass, talc, calcium carbonate, aramid fiber, stainless steel, carbon, and wollastonite. Likewise, the resin may be selected from the group consisting of polypropylene families, polyvinylidene fluoride, acetal families, fully fluorinated polymer families, Perfluoroalkoxy alkanes, fluorinated ethylene propylene, polyamide families, and polyphenylene sulfide.

In comparison, a PRIOR ART resin pump such as diaphragm pump 2' of FIG. 1, may employ about 266 inch$^3$ volume of resin material and have a wall thickness of about 0.75 inches. A comparable pump such as diaphragm pump 2 of FIG. 2, having similar operating specifications, may only employ about 132 inch$^3$ volume of material and have a wall thickness of only about 0.16 inches. This is a substantial decrease in volume and wall thickness which translates into a substantial decrease in use of material. This translates into less cost relative to PRIOR ART diaphragm pump 2'.

Also shown in this view are pluralities of illustrative ribs 34, 36, 38, 40, and 42 supported on manifold 4, fluid chambers 6 and 8, housing 10, and outlet manifold 12, respectively. The number, configuration, spacing, size, thickness, and arrangement of these ribs are illustrative. Such ribs offer increased strength to the pump housing without requiring a substantial amount of additional material. Furthermore, the ribs portion of these pump housing components may be composed of the fiber reinforced resin so they have the benefit of high strength, but are not in contact with any fluid so there is no drag on pumped fluid.

Figure 3:
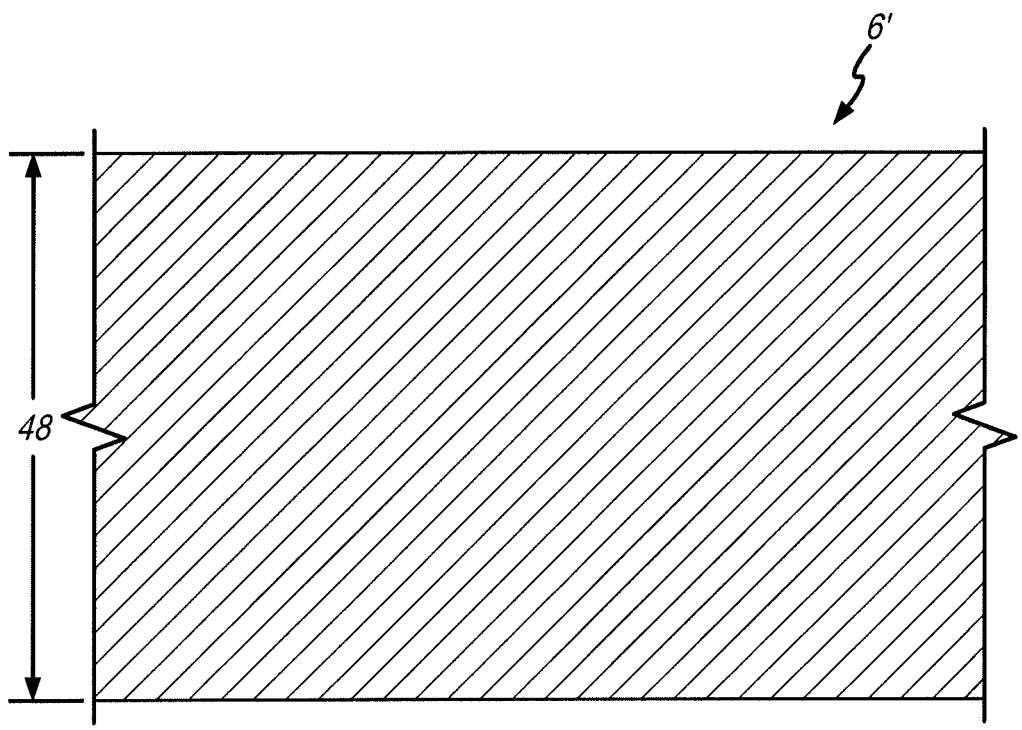
FIG. 3 is a side elevation view of a portion of the wall of a portion of the pump housing of the PRIOR ART diaphragm pump of FIG. 1.

An illustrative embodiment of a portion of a wall of fluid chamber 6' is shown in PRIOR ART FIG. 3. Here, the thickness of this wall portion of fluid chamber 6' is indicated by reference numeral 48'. It is appreciated that all of the various body components of PRIOR ART diaphragm pump 2', shown in FIG. 1, have comparable thicknesses. It is also noted that the material is resin-only.

Figure 4:
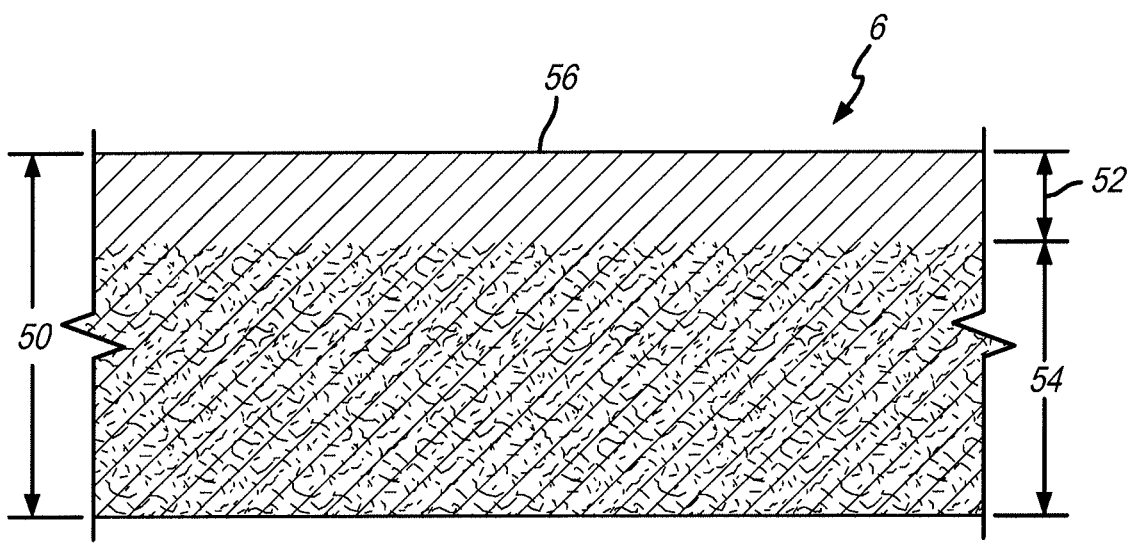
FIG. 4 is a side elevation view of a portion of the wall of a portion of the pump housing of the diaphragm pump of FIG. 2.

In contrast, a cross-sectional view of a wall from fluid chamber 6 of the diaphragm pump 2 of FIG. 2 is shown in FIG. 4. In contrast to thickness 48' of PRIOR ART FIG. 3, thickness 50 shown in FIG. 4 is substantially less. In addition, thickness 50 is composed of separated laminar layers 52 and 54. Separated laminar layer 52 is resin-only just like the resin employed in thickness 48' of fluid chamber 6' shown in PRIOR ART FIG. 3, including a smooth resin fluid-side interior surface 56. That said, thickness 50 is also composed of separated laminate layer 54 which is composed of a reinforcing fiber resin material. As such, wall thickness 50 has the benefit of a resin-only material at the interior fluid-side (i.e., resin surface 56) of diaphragm pump 2, but also has the reinforcing strength of the reinforcing fibers dispersed in the resin in separated laminar layer 54, providing added strength to the housing structure. It will be appreciated by the skilled artisan upon reading this disclosure that even though the wall shown in FIG. 4 is of fluid chamber 6, this is illustrative. These foregoing descriptions apply to the wall structures of the other pump housing components as well.

The separated laminar layers 52 and 54 may be made according to the following process. First, it is noted that thermoplastic-type polymers are non-newtonian viscoelastic fluids. Accordingly, they do not reach turbulence during the fluid or flowing state when deposited in a mold. Rather, they experience laminar flow. Accordingly, when molding any of the parts of diaphragm pump 2 such as inlet manifold 4, fluid chambers 6 or 8, or outlet manifold 12, induction heating elements may be placed on the portion of the mold where fluid will ultimately be flowing through. For example, as shown on FIG. 6, fluid passageways 7, 9, 11 and 13 of inlet manifold 4, fluid chambers 6 and 8, and outlet manifold 12, respectively, receive fluid from a fluid from a fluid source and passes that fluid throughout these pump housing components. When molding these components, placing induction heating elements on the side of the mold where surface 56 (see FIG. 4) forms the fluid passageways 7, 9, 11, 13, provides additional heating to that side of the molded part. This additional heat allows the resin to flow to interior surface 56, which creates the laminar separation between the resin and the reinforcing fibers. This creates the separate layers of resin-only and reinforcing fiber and resin as shown in FIG. 4. Such a process by employing a 3iTECH® technology by Roctool. Induction heating super heats the surface of the mold to the melt temperature of the resin. This allows the resin to flow to that surface creating a laminar separation between the resin and the filler it is carrying. Creating a thicker barrier layer enables a shell on the component's surface to be in contact with the fluid and prevent contamination or reduce the contamination potential. When the pump housing component is removed from the mold, the result is a fluid-side substantially smooth resin-only interior surface, but with a reinforcing fiber resin layer dispersed throughout the remaining thickness of the component wall.

Figure 5:
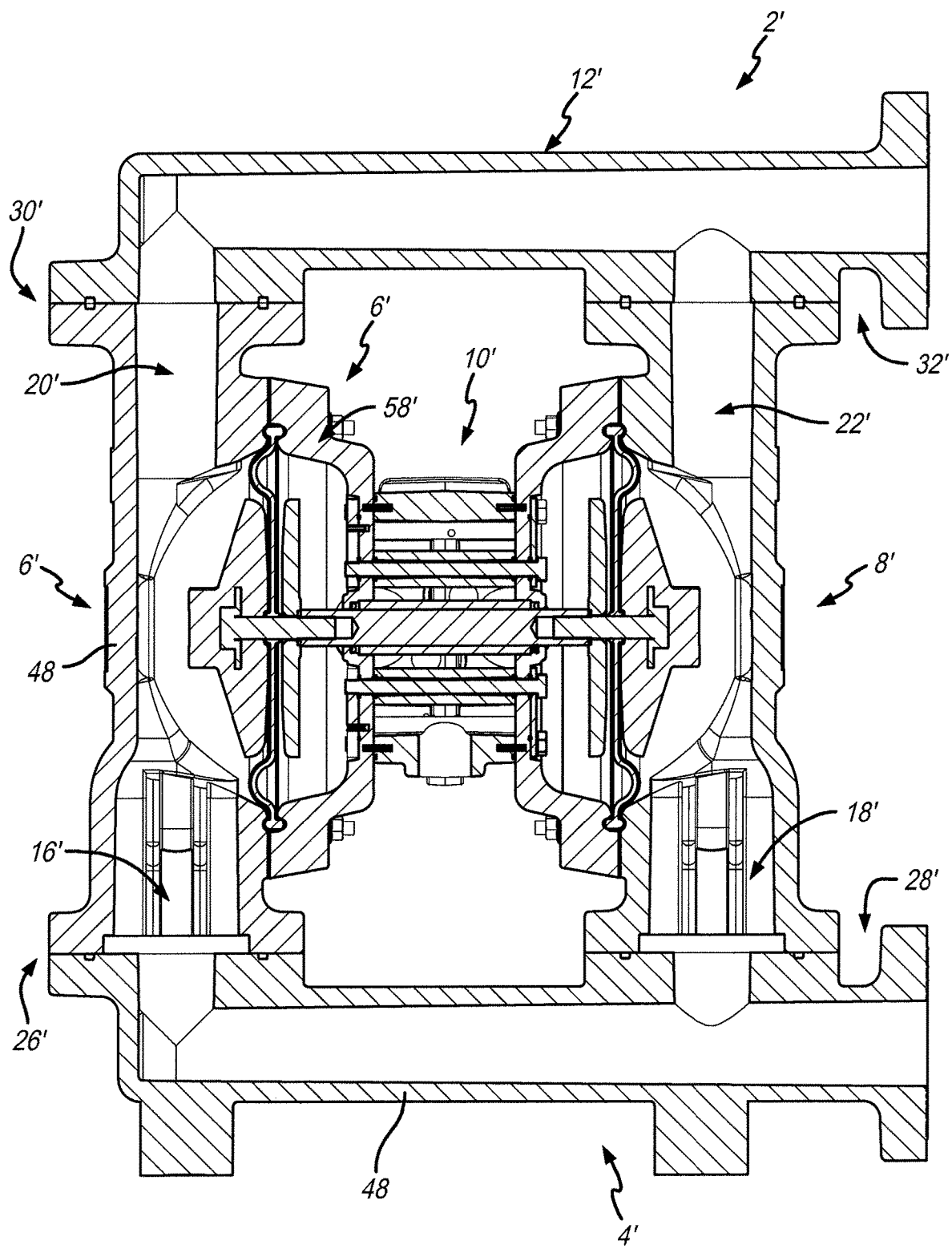
FIG. 5 is a cross-sectional view of the PRIOR ART diaphragm pump of FIG. 1.
Figure 6:
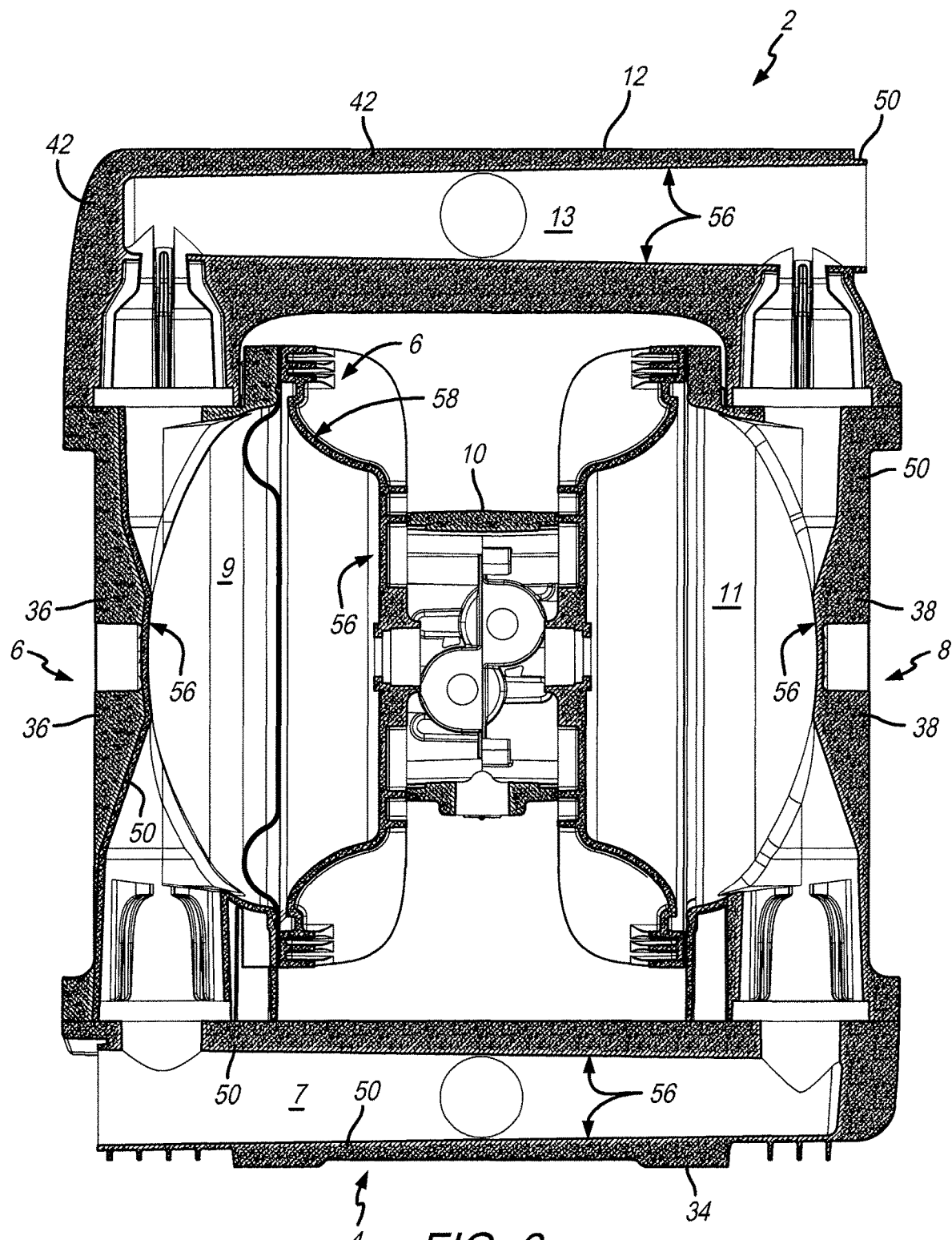
FIG. 6 is a cross-sectional view of the diaphragm pump of FIG. 2.

Cross-sectional views of diaphragm pumps 2' and 2 are shown in PRIOR ART FIG. 5 and FIG. 6, respectively. These views further demonstrate the distinction between the wall thickness of an all-resin pump body wall versus a separated laminar resin-fiber reinforced resin layered pump body wall. As shown in PRIOR ART FIG. 5, for example, an inner portion 58' of fluid chamber 6' clearly has a thickness substantially greater than the corresponding area 58 of fluid chamber 6 of diaphragm pump 2 shown in FIG. 6. All of the housing structures of diaphragm pump 2 show a body thickness 50 that is substantially less than thickness 48' shown in diaphragm pump 2'. It is notable that also visible in FIG. 6 are illustrative ribs 34, 36, 38, and 42. These ribs, however, do not constitute the wall thickness of the body parts of diaphragm pump 2. They merely, as shown in FIG. 2, add structural stability to the pump body walls. It is also appreciated in this view that resin surface 56, of resin only laminar layer 52 (see, also, FIG. 4), is located on the fluid side of diaphragm pump 2 as illustratively shown.

Figure 7:
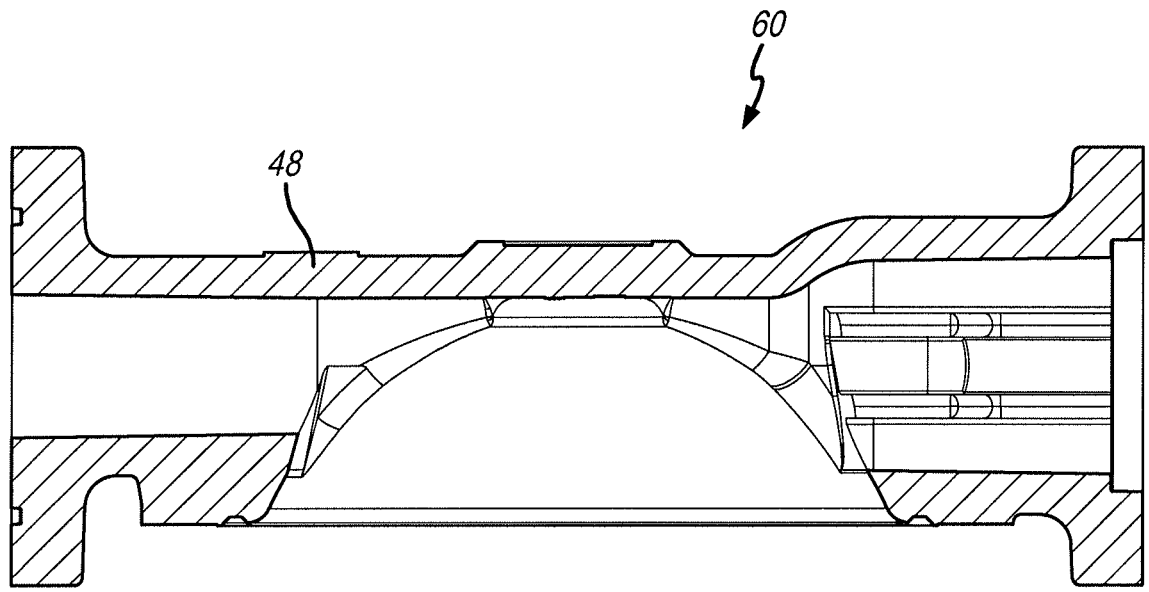
FIG. 7 is a side cross-sectional view of a portion of the PRIOR ART diaphragm pump of FIG. 1.
Figure 8:
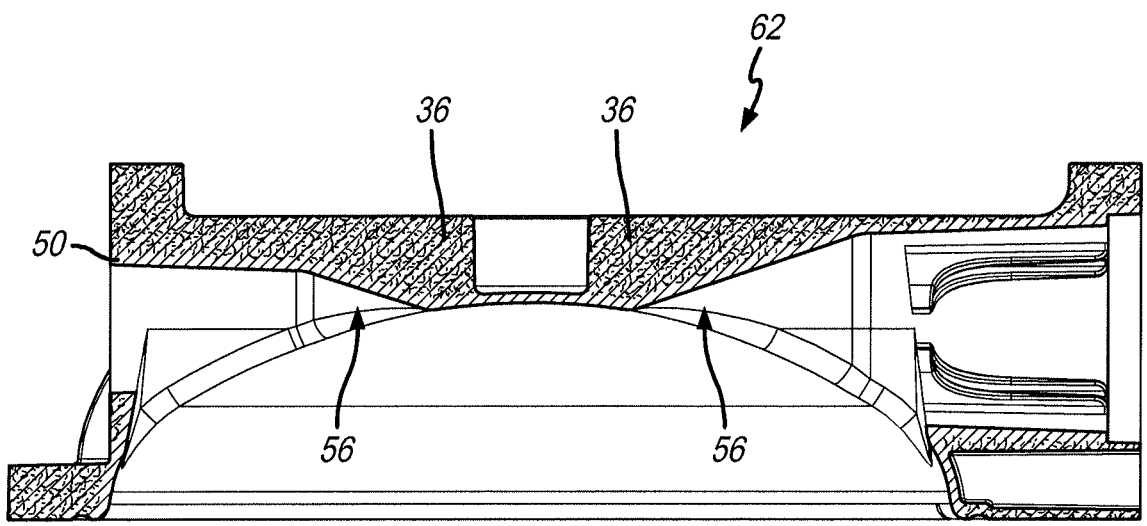
FIG. 8 is a side cross-sectional view of a portion of the diaphragm pump of FIG. 2.
Figure 9:
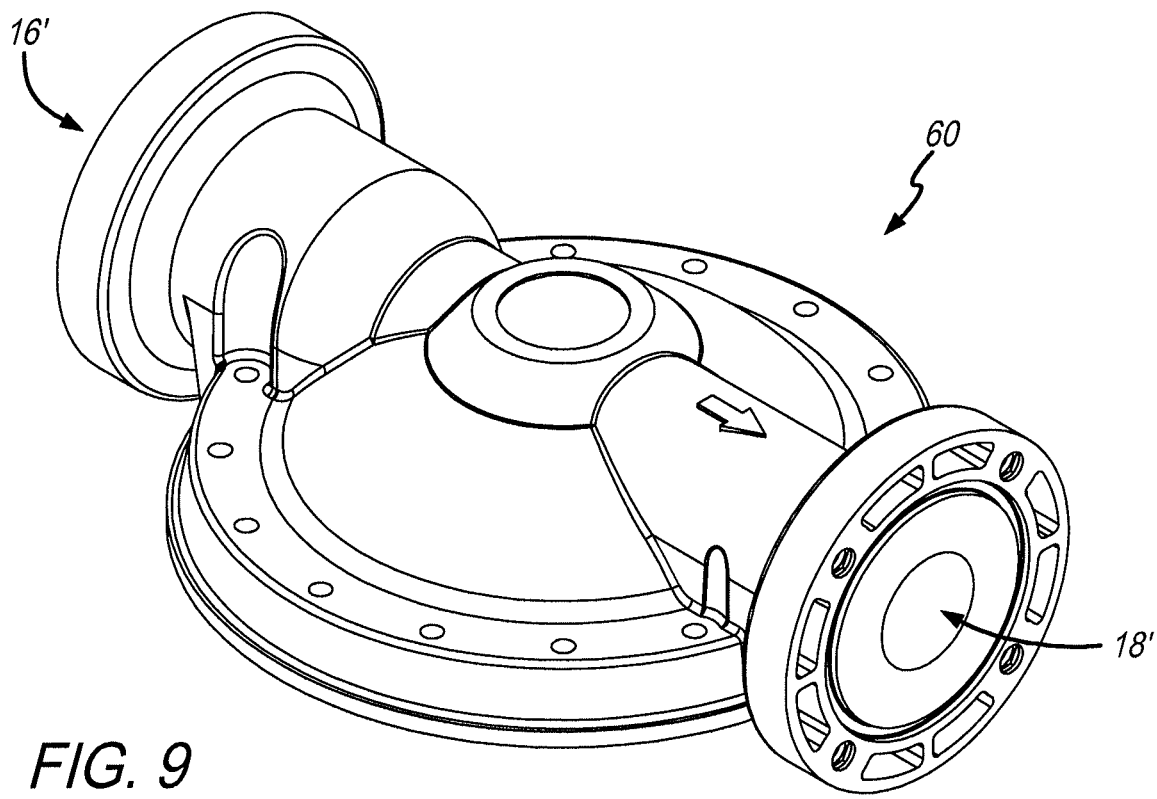
FIG. 9 is a perspective view of the portion of the PRIOR ART diaphragm pump of FIG. 7.
Figure 10:
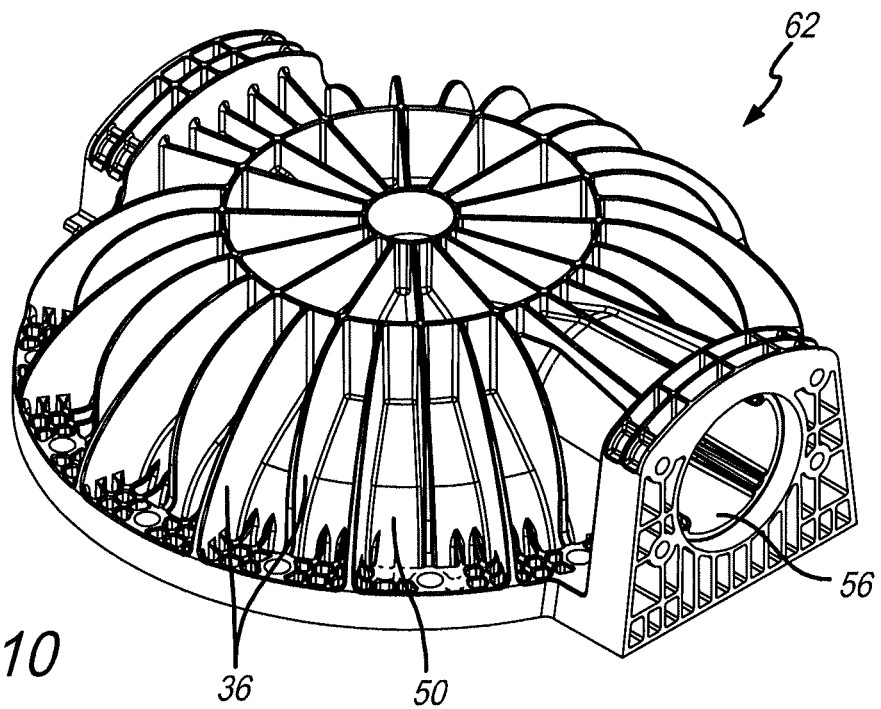
FIG. 10 is a perspective view of the portion of the diaphragm pump of FIG. 8.

Cross-section and perspective views of illustrative conventional pump head 60, shown in PRIOR ART FIGS. 7 and 9, respectively, are contrasted with a separated laminar layer pump head 62 shown in FIGS. 8 and 10, respectively. These views further demonstrate the distinction between the PRIOR ART resin-only pump body thickness 48 and the thin wall thickness 50 of the separated laminar layers. With particular regards to pump head 62, they require substantially less volume of material in order to produce a pump housing wall. It is also appreciated in these views that illustrative ribs 36 (like the other ribs) will be fiber reinforced as well. This produces further structural strength. Because resin 56 is on the fluid side of pump body walls, there is no risk that fibers dispersed throughout the rest of the thickness of the pump body will cause irregularities in interior surface 56 to create a potential for contamination.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The invention claimed is:

1. A pump configured to move fluid from one location to another location, the pump comprising:
   an inlet manifold;
   at least one fluid chamber in fluid communication with the inlet manifold;
   an outlet manifold in fluid communication with the fluid chamber;
   wherein the inlet manifold, the outlet manifold, and the at least one fluid chamber collectively form a pump housing of the pump;
   wherein the pump housing is composed of a wall structure;
   wherein the wall structure includes a fluid-side interior surface, an exterior surface, and a thickness located between the fluid-side interior and exterior surfaces;
   wherein the fluid-side interior surface of the wall structure is in fluid contact with the fluid that is moved through the pump;
   wherein the pump housing is composed of a resin having reinforcing fibers dispersed in the resin throughout the thickness of the wall structure except at the fluid-side interior surface of the pump housing;
   wherein the fluid-side surface of the pump housing is composed of resin and is free of the reinforcing fibers that are otherwise dispersed throughout the thickness of the pump housing;
   wherein the wall structure of each of the inlet manifold, the outlet manifold, and the at least one fluid chamber includes at least one or more ribs extending from the exterior surface opposite the fluid-side surface of the wall structure;
   wherein the wall structure of each of the inlet manifold, the outlet manifold, and the at least one fluid chamber each includes at least one cross rib extending from the exterior surface opposite the fluid-side surface of the wall structure and transverse to the at least one or more ribs; and
   where each of the at least one or more ribs and the at least one cross rib are composed of the resin having reinforcing fibers dispersed in the resin.

2. The pump of claim 1, wherein the pump housing includes a second fluid chamber in fluid communication with the inlet and the outlet manifolds.

3. The pump of claim 1, wherein the pump is a diaphragm pump.

4. The pump of claim 1, wherein the reinforcing fibers are selected from the group consisting of at least one of glass, talc, calcium carbonate, aramid fiber, stainless steel, carbon, and wollastonite.

5. The pump of claim 1, wherein the resin is selected from the group consisting of at least one of polypropylene, polyvinylidene fluoride, acetal, fluorinated polymer, Perfluoroalkoxy alkanes, fluorinated ethylene propylene, polyamide, and polyphenylene sulfide.

6. The pump of claim 1, wherein the fluid-side interior surface is not a separably distinct layer laminated onto the resin having reinforcing fibers dispersed in the resin throughout the thickness of the wall structure.

7. The pump of claim 1, wherein a laminar portion of the thickness opposite the exterior surface and at the fluid-side interior surface is composed of the resin that does not include any reinforcing fibers.

8. The pump of claim 1, wherein the at least one or more ribs is a plurality of spaced-apart ribs.

9. The pump of claim 1, wherein the at least one transverse rib is a plurality of transverse ribs.

10. A pump configured to move fluid from one location to another location, the pump comprising:
a pump housing of the pump;
wherein the pump housing is composed of a wall structure;
wherein the wall structure includes a fluid-side interior surface, an exterior surface, and a thickness located between the fluid-side interior and exterior surfaces;
wherein the fluid-side interior surface of the wall structure is in fluid contact with the fluid that is moved through the pump;
wherein the pump housing is composed of a resin having reinforcing fibers dispersed in the resin throughout the thickness of the wall structure except at the fluid-side interior surface of the pump housing; and
wherein the fluid-side surface of the pump housing is composed of resin and is free of the reinforcing fibers that are otherwise dispersed throughout the thickness of the pump housing.

11. The pump of claim 10, wherein the pump housing of the pump includes an inlet manifold, at least one fluid chamber in fluid communication with the inlet manifold, and an outlet manifold in fluid communication with the fluid chamber.

12. The pump of claim 11, wherein the inlet manifold, the outlet manifold, and the at least one fluid chamber collectively form a pump housing of the pump.

13. The pump of claim 12, wherein the wall structure of each of the inlet manifold, the outlet manifold, and the at least one fluid chamber includes at least one or more ribs extending from the exterior surface opposite the fluid-side surface of the wall structure.

14. The pump of claim 13, wherein the wall structure of each of the inlet manifold, the outlet manifold, and the at least one fluid chamber each includes at least one cross rib extending from the exterior surface opposite the fluid-side surface of the wall structure and transverse to the at least one or more ribs.

15. The pump of claim 14, wherein each of the at least one or more ribs and the at least one cross rib are composed of the resin having reinforcing fibers dispersed in the resin.

16. The pump of claim 10, wherein the fluid-side interior surface is not a separably distinct layer laminated onto the resin having reinforcing fibers dispersed in the resin throughout the thickness of the wall structure.

17. The pump of claim 10, wherein a laminar portion of the thickness opposite the exterior surface and at the fluid-side interior surface is composed of the resin that does not include any reinforcing fibers.

18. The pump of claim 15, wherein the at least one or more ribs is a plurality of spaced-apart ribs, and wherein the at least one transverse rib is a plurality of transverse ribs.

19. A pump configured to move fluid from one location to another location, the pump comprising:
a pump housing of the pump;
wherein the pump housing is composed of a wall structure; and
wherein a first laminar portion of a thickness of the wall structure composed a resin that does not include any reinforcing fibers and a second laminar portion of the thickness of the wall structure composed a resin with reinforcing fibers dispersed through the resin.

20. The pump of claim 19, wherein the wall structure includes a fluid-side interior surface and exterior surface, wherein the thickness is located between the fluid-side interior and exterior surfaces, and wherein the first laminar portion of the thickness of the wall structure is located at the fluid-side interior surface and the second laminar portion of the thickness of the wall structure is located adjacent the first laminar portion and the exterior surface.

* * * * *